Figure 1:
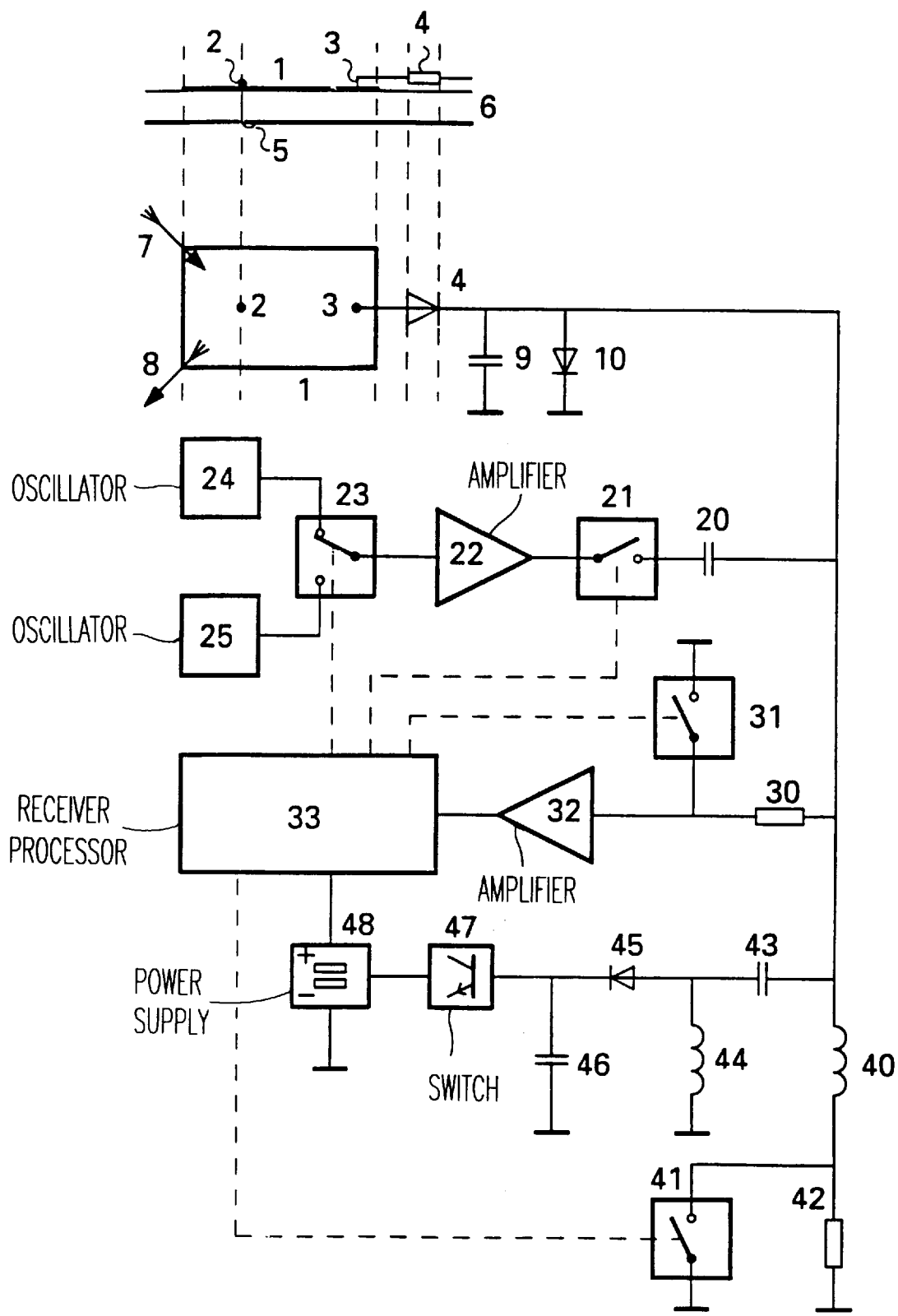

United States Patent [19]

Schmidt et al.

[11] Patent Number: 5,826,175
[45] Date of Patent: Oct. 20, 1998

[54] ACTIVE TAG HAVING ONE DIODE FOR MODULATION AND DEMODULATION

[75] Inventors: Johan Richard Schmidt, Leiden; Eric Johannes De Kok, Nootdorp; Jacob Cornelis Stolk, Berkel & Rodenrijs, all of Netherlands

[73] Assignee: Koninklijke PTT Nederland N.V., Groningen, Netherlands

[21] Appl. No.: 760,803

[22] Filed: Dec. 5, 1996

[30] Foreign Application Priority Data

Dec. 7, 1995 [NL] Netherlands ............................ 1001840

[51] Int. Cl.$^6$ ........................................................ H04B 1/40
[52] U.S. Cl. ............................. 455/77; 455/106; 455/121; 340/825.54
[58] Field of Search ................................. 455/66, 77, 120, 455/121, 129, 106, 107, 296; 340/505, 572, 825.54

[56] References Cited

U.S. PATENT DOCUMENTS

| 5,313,211 | 5/1994 | Tokuda et al. | 455/106 |
| 5,491,715 | 2/1996 | Flaxl | 455/121 |
| 5,530,637 | 6/1996 | Fujita et al. | 455/300 |
| 5,649,295 | 7/1997 | Shober et al. | 455/106 |
| 5,649,296 | 7/1997 | MacLellan et al. | 455/106 |

FOREIGN PATENT DOCUMENTS 0 533 062 A1  3/1993  European Pat. Off. .
2 527 870  12/1983  France .

OTHER PUBLICATIONS

Patent Abstracts of Japan, vol. 6, No. 21 (E–093), Feb 6, 1982, JP56–141605, Nov. 5, 1981.

Patent Abstracts of Japan, vol. 10, No. 137 (E–405), May. 21, 1986, JP61–001102, Jan. 7, 1986.

Daniel H. Schaubert, et al. "Microstrip Antennas with Frequency Agility and Polarization Diversity", IEEE Transactions on Antennas and Propagation, vol. AP–29, No. 1, (pp. 118–123), Jan. 1981.

Ch. Delaveaud, et al. "New Kind of Microstrip Antenna: The Monopolar Wire–Patch Antenna", Electronics Letters, vol. 30, No. 1, (p. 1), Jan. 6, 1994.

Primary Examiner—Edward F. Urban
Attorney, Agent, or Firm—Oblon, Spivak, McClelland, Maier & Neustadt, P.C.

[57] ABSTRACT

Known tags which are capable of receiving and demodulating signals by way of one and the same antenna and by way of one and the same diode, as well as being capable of modulating and transmitting signals, often have a poor efficiency, particularly if the antenna is implemented in the form of a flat plate. By coupling a high-ohm first terminal of the antenna to the diode, and coupling a low-ohm second terminal to earth by way of an inductive element, there is obtained a tag which has a good efficiency, both regarding the reception and demodulation of signals and regarding the modulation and transmission of signals.

8 Claims, 1 Drawing Sheet

ACTIVE TAG HAVING ONE DIODE FOR MODULATION AND DEMODULATION

BACKGROUND OF THE INVENTION

The invention relates to a tag provided with
an antenna for receiving a carrier-wave signal,
a tag circuit coupled to the antenna, and
a diode located between the antenna and the tag circuit.

Such a tag is disclosed in EP 0 552 828. The tag described therein is provided with
an antenna for receiving a carrier-wave signal,
a tag circuit coupled to the antenna, and
a diode located between the antenna and the tag circuit.

By way of the antenna, the carrier-wave signal modulated in amplitude with first information is received, which is then demodulated by way of the diode, whereafter the first information is fed to the tag circuit for processing said first information. The tag circuit then generates second information, and the carrier-wave signal is modulated in phase and/or in frequency with said second information by way of the same diode, whereafter the carrier-wave signal modulated in phase and/or in frequency is transmitted back on the basis of reflection by way of the antenna.

Such a known tag has the drawback, inter alia, that it has a poor efficiency either at least as for receiving and demodulating signals, or at least as for modulating and transmitting signals, particularly if the antenna is constructed in the form of a flat plate.

SUMMARY OF THE INVENTION

The object of the invention is, inter alia, to provide a tag of the type referred to in the preamble, which has a superior efficiency both as for receiving and demodulating signals and as for modulating and transmitting signals.

For this purpose, the tag according to the invention is characterised in that the antenna comprises a first terminal and a second terminal, which first terminal is of a higher ohmic value than the second terminal, which first terminal is coupled to the diode, and which second terminal is coupled to earth by way of an inductive element.

By coupling a high-ohm first terminal of the antenna to the diode, and coupling a low-ohm second terminal to earth by way of an inductive element, there is obtained a tag which has a good efficiency, both as for receiving and demodulating signals and as for modulating and transmitting signals.

The invention is based on the insight, inter alia, that the poor efficiency of a tag to a not unimportant extent is the result of an incorrect impedance adjustment between the antenna and the diode, and that an inductive element connected to earth, which is coupled directly to the diode for realising a DC setting, renders a good impedance adjustment impossible.

In this manner, the problem of the poor efficiency of the known tag is solved by connecting the diode (such as, e.g., a so-called zero-bias diode of the company HP or of the company MACON) by way of consecutively the high-ohm first terminal of the antenna and the low-ohm second terminal of the antenna and the inductive element to earth. If the tag is designed for a carrier-wave frequency of, e.g., 5.8 GHz or, e.g., 2.24 GHz, a short conductive wire already has sufficient inductivity to be capable of functioning as an inductive element.

A first embodiment of the tag according to the invention is characterised in that a first side of the diode is coupled to the first terminal and a second side of the diode is coupled to the tag circuit, which second side of the diode is coupled to earth by way of a capacitive element.

By coupling the first side of the diode to the first terminal and coupling :he second side of the diode to the tag circuit and to earth by way of a capacitive element, there is obtained a tag which is eminently suitable for both receiving and demodulating the carrier-wave signal and for modulating and transmitting the carrier-wave signal.

A second embodiment of the tag according to the invention is characterised in that the second side of the diode is coupled to earth by way of a non-linear element, with the tag circuit being provided with a signal generator for generating a signal to be transmitted by way of the carrier-wave signal.

By coupling the second side of the diode to earth by way of a non-linear element, with the tag circuit being provided with a signal generator for generating a signal to be transmitted by way of the carrier-wave signal, the capability is created of advantageously driving the diode, with the threshold voltage of the diode being less than a threshold voltage of said non-linear element.

A third embodiment of the tag according to the invention is characterised in that the non-linear element comprises a further diode.

By constructing the non-linear element as a further diode, there is effected a cheap realisation of the non-linear element. If the threshold voltage of the diode amounts to approx. 0 volt, there might be applied, as a further diode, e.g., a common silicon diode having a threshold voltage of 0.7 volt or even a germanium diode having a treshold voltage of 0.4 volt.

A fourth embodiment of the tag according to the invention is characterised in that the signal generator is provided with oscillator means for generating a signal having a varying frequency or phase, with a first amplitude of said signal bringing the non-linear element in a conductive state and bringing the diode in a non-conductive state, and a second amplitude of said signal bringing the non-linear element in a non-conductive state and bringing the diode in a conductive state, and with which signal the carrier-wave signal is modulated in frequency or phase by way of the diode.

By providing the signal generator with oscillator means for generating a signal having a varying frequency or phase, with which signal the carrier-wave signal received is modulated in frequency or phase by way of the diode, with the first amplitude of said signal bringing the non-linear element in forward and bringing the diode in reverse, and the second amplitude of said signal bringing the non-linear element in reverse and bringing the diode in forward, the combination of the diode and the non-linear element, such as, e.g., a further diode, is driven with an analogue signal having a varying frequency or phase, while the carrier-wave signal received is modulated according to a digital modulation form (since the analogue signal having a varying frequency or phase affects the reflection coefficient of the antenna).

A fifth embodiment of the tag according to the invention is characterised in that the tag circuit is provided with a signal receiver for receiving a signal transmitted by way of the carrier-wave signal.

By providing the tag circuit with a signal receiver for receiving a signal transmitted by way of the carrier-wave signal, which receiver, with respect to the antenna and the diode, is located in parallel to the signal generator, the tag is provided with a receiver part which is separated from the transmitter part.

A sixth embodiment of the tag according to the invention is characterised in that the signal receiver is provided with an activating circuit which comprises an LC circuit for boosting the signal transmitted by way of the carrier-wave signal, and which comprises a switch coupled to the LC circuit for, in response to the boosted signal, activating a power supply of the tag circuit.

By providing the signal receiver with an activating circuit which comprises an LC circuit for the entranced oscillation of the signal transmitted by way of the carrier-wave signal, and which comprises a switch coupled to the LC circuit for, in response to the entranced-oscillation signal, activating a power supply of the tag circuit, there is obtained a tag in which a power supply is activated only after receiving the transmitted signal, which makes it possible to work, e.g., five years with the same (battery) supply.

A seventh embodiment of the tag according to the invention is characterised in that the activating circuit comprises a coil located in parallel to the LC circuit.

By having the activating circuit comprise a coil located in parallel to the LC circuit, the already good efficiency of the tag is further improved.

An eighth embodiment of the tag according to the invention is characterised in that the activating circuit comprises a parallel circuit of a resistor and a further switch, said parallel circuit being located in series with the coil, which further switch in a quiescent condition has a lower impedance than the resistor, and which further switch after activation by the switch has a higher impedance than the resistor.

By having the activating circuit comprise a parallel circuit of a resistor and a further switch located in series with the coil, which further switch in a quiescent condition has a lower impedance than the resistor, and which further switch after activation by the switch has a higher impedance than the resistor, the activating circuit, as a result of the higher impedance, becomes of less influence, after activation, on the data transmitted to the tag by way of the carrier wave. Particularly if the further switch is in the quiescent condition, the efficiency of the tag turns out to be further improved by the application of the coil.

A ninth embodiment of the tag according to the invention is characterised in that the signal receiver is provided with a data receiver for receiving data, which data is modulated onto the carrier-wave signal and which data has been obtained by demodulation, by way of the diode, of the carrier-wave signal modulated with the data.

By providing the signal receiver with a data receiver for receiving said data, which data receiver is located in the signal receiver in parallel to the activating circuit with respect to the antenna and the diode, and which data receiver and activating circuit are therefore also located, with respect to the antenna and the diode, in parallel to the signal generator, the tag disposes of a receiver part in which the data reception and the reception of the activating signal are separated.

REFERENCES

EP 0 552 828.

All references are considered to be incorporated in the present application.

EXEMPLARY EMBODIMENT

The invention will be explained in greater detail by reference to an exemplary embodiment shown in FIG. 1, which comprises a tag according to the invention.

The tag shown in FIG. 1 comprises a so-called flat-plate antenna 1, also sometimes called a patch antenna, and is in the form of, e.g., a rectangle of conductive material located on the topside of, e.g., a printed-circuit board 6 (which rectangle was retained, e.g., after application of an etching technique). Antenna 1 serves for receiving an incoming carrier-wave signal 7 (including a signal possibly added to said carrier-wave signal by way of, e.g., amplitude modulation) and serves for transmitting, on the basis of reflection, an outgoing carrier-wave signal (including a signal possibly added to said carrier-wave signal by way of, e.g., frequency and/or phase modulation). The underside of printed-circuit board 6 is also of conductive material and serves as earth. A low-ohm terminal 2 of antenna 1 is coupled, by way of a wire 5, which functions as inductive element, to earth (the conductive underside of printed-circuit board 6). A high-ohm terminal 3 of antenna 1 is directly (i.e., without intervention of a transmission line) coupled to the anode of an RF [radio-frequency] diode 4, whose cathode is coupled to one side of a capacitive element 9 and to the anode of a further diode 10. The other side of the capacitive element 9 and the cathode of the further diode 10 are each connected to earth. Here, further diode 10 is a particularisation of what in general might be a non-linear element.

The tag further consists of a tag circuit, which comprises a signal generator for generating a signal to be transmitted by way of the carrier-wave signal, and which comprises a signal receiver for receiving a signal transmitted by way of the carrier-wave signal. The signal generator comprises a first oscillator 24, of which an output is connected to a first switching contact of a selector switch 23, and comprises a second oscillator 25, of which an output is connected to a second switching contact of selector switch 23, of which a main contact is coupled to an input of an amplifier 22. An output of amplifier 22 is coupled, by way of a switching means 21 being in non-conductive mode when in quiescent condition, and a capacitor 20, to the cathode of RF diode 4. Here, first oscillator 24 and second oscillator 25 and selector switch 23 together form so-called oscillator means.

The signal receiver comprises processor means 33, of which an input is coupled to an output of an amplifier 32. An input of amplifier 32 is coupled, by way of a resistive element 30, to the cathode of RF diode 4. The input of amplifier 32 is coupled to earth by way of a switching means 31 being in conductive mode when in quiescent condition. Processor means 33 are further connected to a power supply 48, which is coupled to a switch 47 for activating/deactivating said power supply 48. A control input of switch 47 is coupled to earth by way of a capacitor 46 and is connected to a cathode of a still further diode 45. An anode of still further diode 45 is coupled to a common point of a serial LC circuit, of which an inductance 44 is coupled to earth and of which a capacitor 43 on one side is coupled to the cathode of RF diode 4 and on the other side is coupled, by way of a coil 40, to a parallel circuit of a resistor 42 and a further switch 41. Said further switch 41 in a quiescent condition has a lower impedance (e.g., 1 ohm) than resistor 42, and after activation by switch 47 has a higher impedance (e.g., 1 MΩ) than resistor 42. Processor means 33 control selector switch 23, switching means 21, switching means 31 and further switch 41, and operate in combination with amplifier 32 as a data receiver for receiving data, which data is modulated, in a transmitter not shown in FIG. 1, onto the carrier-wave signal by way of, e.g., amplitude modulation, and which data has been obtained by demodulating, by way of the RF diode 4, the carrier-wave signal modulated with the data. After activation, power supply 48 of course feeds not only processor means 33, but also amplifier 22, amplifier 32, selector switch 23, switching means 21, switching means 31 and further switch 41, something which is not shown in FIG. 1, however.

The operation of the tag shown in FIG. 1 is as follows. A first carrier-wave signal 7, to which an activating signal is added by way of, e.g., amplitude modulation, arrives at antenna 1 and is demodulated by way of RF diode 4, with the combination of RF diode 4 and capacitive element 9 operating as a peak detector. The activating signal is added to the signal generator and the signal receiver. Since switching means 21 is in non-conductive mode, the signal generator hardly affects said activating signal, and the activating signal does not enter the signal generator. Since switching means 31 is in conductive mode, the activating signal is admittedly discharged to earth by way of resistive element 30, but in the event of a sufficiently large value of resistive element 30 this has only a very slight influence on the activating signal. Furthermore, the activating signal is subjected to entranced oscillation by the LC circuit consisting of capacitor 43 and inductance 44, with coil 40, as a result of further switch 41 being in quiescent condition (in which case further switch 41 therefore has a much lower impedance than resistor 42), further increasing said entranced oscillation (coil 40 therefore improves the efficiency of the tag as far as the reception of the activating signal is concerned). The combination of coil 40, capacitor 43, inductance 44, still further diode 45 and capacitor 46 operates as a band-pass filter which lets the activating signal pass as a result of the entire combination being tuned to the predetermined frequency of the activating signal. In response to said activating signal, switch 47 activates power supply 48, which then feeds, e.g., during a predetermined time interval, processor means 33, amplifier 22, amplifier 32, selector switch 23, switching means 21, switching means 31 and further switch 41. In this manner, the tag is (temporarily) activated.

Then there arrives, e.g., a second carrier-wave signal 7 to which data has been added at antenna 1 by way of, e.g., amplitude modulation, and said carrier-wave signal is demodulated by way of RF diode 4, with the combination of RF diode 4 and capacitive element 9 operating as a peak detector. The data is added to the signal generator and the signal receiver. Since switching means 21 is in non-conductive mode, the signal generator hardly affects said data and the data does not enter the signal generator. Since switching means 31 under control of processor means 33 is now in non-conductive mode, however, the activating signal is fed, by way of resistive element 30, to the input of amplifier 32, which amplifies the data and passes it on to processor means 33 for processing. Furthermore, the data which has a different frequency from the activating signal, is not subjected to entranced oscillation by the LC circuit consisting of capacitor 43 and inductance 44, with coil 40, as a result of further switch 41 now being in activated mode under control of processor means 33 (in which case further switch 41 therefore has a much higher impedance than resistor 42), not improving the efficiency of the tag. After all, this is not required as far as the reception of the data is concerned, since power supply 48 has been activated and amplifier 32 has been switched on and thereby has obtained an amplifying effect. The combination of coil 40, capacitor 43, inductance 44, still further diode 45 and capacitor 46 in this case once again operates as a band-pass filter which blocks the data, however, as a result of the entire combination not being tuned to the predetermined frequency of the data. In this manner, data is fed to the (temporarily) activated tag.

If subsequently a signal should be transmitted from the (temporarily) activated tag, processor means 33 bring switching means 21 in conductive mode, and the processor means generate a control signal which controls selector switch 23. As a result, in the event of a bit of one type, first oscillator 24 is coupled through to amplifier 22, and in the event of a bit of another type, second oscillator 25 is coupled through to amplifier 22. By way of switching means 21 and capacitor 20, the signal having varying frequency and/or phase is fed to RF diode 4, which then modulates a received, non-modulated carrier-wave signal 7 in frequency and/or phase with said signal, whereafter the modulated carrier-wave signal 8 is transmitted on the basis of reflection. In this case, a first amplitude of said signal brings the further diode 10 in forward and the RF diode 4 in reverse, and a second amplitude of said signal brings the further diode 10 in reverse and the RF diode 4 in forward. Since switching means 31, under control of processor means 33, now again is in conductive mode, said signal having varying frequency and/or phase is discharged to earth by way of resistive element 30, which prevents the signal to be transmitted from entering the signal receiver. Furthermore the signal which, just as the data, has another frequency than the activating signal, is not subjected to entranced oscillation by the LC circuit consisting of capacitor 43 and inductance 44, with coil 40, as a result of further switch 41 now being in activated mode under control of processor means 33 (in which case further switch 41 therefore has a much higher impedance than resistor 42), not improving the efficiency of the tag. After all, this is not required as far as the transmission of a signal is concerned, since power supply 48 has been activated and amplifier 22 has been switched on and thereby has been given an amplifying effect. The combination of coil 40, capacitor 43, inductance 44, still further diode 45 and capacitor 46 in this case once again operates as a band-pass filter which blocks the data, however, as a result of the entire combination not being tuned to the predetermined frequency of said signal. In this manner, the signal is transmitted from the (temporarily) activated tag on the basis of reflection of the carrier-wave signal.

Determining the low-ohm terminal 2 of antenna 1 is done by calculation or, e.g., by applying a measuring device known to those skilled in the art, which determines the reflection of a signal transmitted by the measuring device, with said measuring device then being connected by way of a coax cable whose shield is connected to earth and whose end is coupled to antenna 1 by way of a hole drilled in the printed-circuit board. A minimum reflection implies that, if the impedance of the coax cable amounts to approx. 50 ohm, the impedance of the terminal in question also amounts to approx. 50 ohm, which may be considered a low-ohm value. A different terminal with a still lower ohmic value may of course also be chosen as a low-ohm terminal.

Determining the high-ohm terminal 3 of antenna 1 is done by calculation or, e.g., by connecting (soldering) the anode of RF diode 4 consecutively to several points of the edge of antenna 1, and by measuring the voltage of a received signal at the cathode of RF diode 4. A maximum voltage implies that the impedance of the point in question has the highest ohmic value. In general, the high-ohm terminal 3 of antenna 1 will lie at the edge and, if antenna 1 is in the form of a rectangle, said point will often lie substantially halfway along a radiating side. In the event of, e.g., a round antenna 1, basically each point on the edge is a high-ohm point. The higher the ohmic value of the high-ohm terminal 3 is, the lower the associated power consumption will be, which strongly improves the lifetime of a battery supply. As to said high-ohm terminal, it should be further noted that, where in the past with known tags the anode of RF diode 4 was coupled to the antenna by way of a so-called transmission line having a length of a quarter wavelength, therefore now, with the tag according to the invention, the anode of RF diode 4 may be coupled to the high-ohm point 3 directly and without transmission line.

By applying the inductive element 5 located between earth and the low-ohm terminal, a DC setting of RF diode 4 becomes possible without interfering elements being located between the anode of RF diode 4 and antenna 1, which is of great advantage. In addition, it is very advantageous that RF diode 4 has a dual function: on the one hand demodulation of the carrier-wave signal 7 received and modulated by way of, e.g., amplitude modulation, and on the other hand modulating and/or mixing the carrier-wave signal 8 to be transmitted with the signal originating from the oscillator means, by way of, e.g., frequency and/or phase modulation.

Instead of the LC circuit comprising capacitor 43 and inductance 44, there might be applied a very sensitive amplifier, with the drawback, however, that such a very sensitive amplifier should then be fed continuously, which is not conducive to the lifetime of a battery supply.

We claim:

1. A tag system comprising:

an antenna configured to receive a carrier-wave modulated with data, said antenna including a first antenna terminal and a second antenna terminal, said first antenna terminal being configured to have a higher ohmic impedance value than the second antenna terminal;

a diode having a first diode terminal coupled to the first antenna terminal to receive the carrier wave modulated with data and a second diode terminal providing a demodulated first data output;

a source of earth potential;

a capacitive element coupling said second diode terminal to the source of earth potential;

an inductive element coupling said second antenna terminal to the source of earth potential;

a tag circuit further coupled to said second diode terminal, said tag circuit comprising, an activating portion coupled to said second diode terminal and configured to receive said demodulated first data output and to selectively produce an activation signal based upon a characteristic of said demodulated first data output to activate control circuitry, a generator portion selectively coupled to the second diode terminal in response to activation of the control circuitry, said generator portion having an oscillator circuit configured to generate a tag signal of varying frequency or phase in response to the activation of the control circuitry, said tag signal having a first amplitude level and a second amplitude level; and wherein said first amplitude level of the tag signal renders the diode nonconducting and the second amplitude level of the tag signal renders the diode conducting when the tag signal is selectively applied to the second diode terminal by the generator portion.

2. The tag system according to claim 1, wherein the second diode terminal is also coupled to the source of earth potential by a non-linear element.

3. The tag system according to claim 2, wherein the non-linear element is a further diode.

4. The tag system according to claim 3, wherein the first amplitude level of the tag signal renders the further diode conducting and the second amplitude level of the tag signal renders the further diode non-conducting when the tag signal is selectively applied to the second diode terminal by the generator portion.

5. The tag system according to claim 2, wherein the first amplitude level of the tag signal renders the non-linear element conducting and the second amplitude level of the tag signal renders the non-linear element non-conducting when the tag signal is selectively applied to the second diode terminal by the generator portion.

6. The tag system according to any one of claims 1, 2, 3, 5, or 4, wherein the activation portion includes an activating circuit comprising a coil connected in parallel to inductance-capacitance circuit, the inductance-capacitance circuit being coupled to a switch element responsive to the activation signal to activate a power supply to provide activating power to the control circuitry.

7. The tag system according to claim 6, wherein the activating circuit further comprises a parallel circuit of a resistor and a further switch connected in series with the coil, said further switch having lower impedance than said resistor in a non-active state and a higher impedance than the resistor when in an active state, said further switch being configured to respond to said control circuitry to be placed in said active state.

8. The tag system according to claim 6, wherein a data receiver is further coupled via an input circuit to the second terminal of the diode, said input circuit being enabled by the control circuitry to pass a demodulated second data signal from the second terminal of the diode to a data processor.

* * * * *